Sept. 17, 1963
H. E. ERIKSON ETAL
3,103,864
PHOTOGRAPHIC FILM HOLDER
Filed Aug. 24, 1962
3 Sheets-Sheet 1
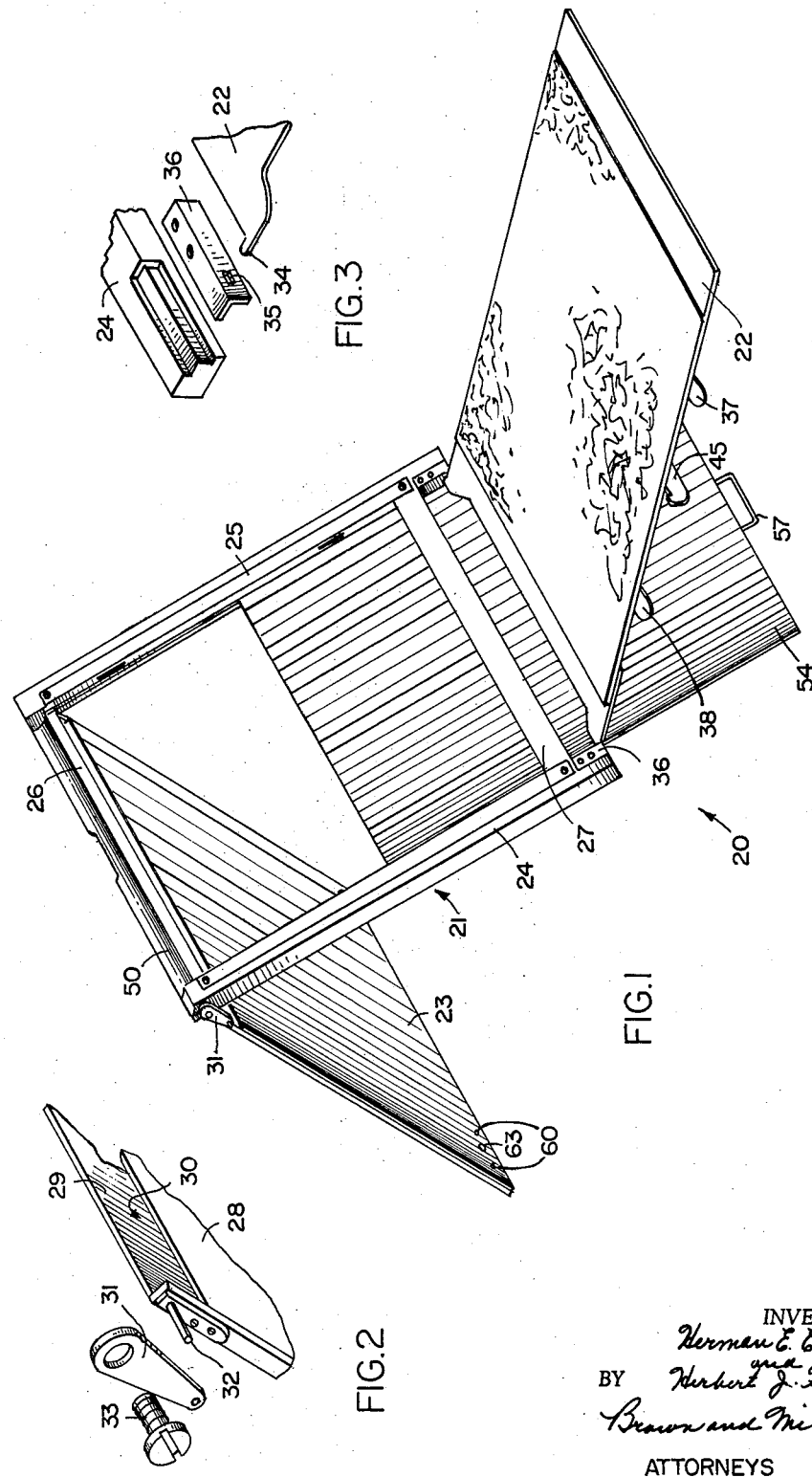
INVENTORS
Herman E. Erikson
and
BY Herbert J. Frede
Brown and Mikulka
ATTORNEYS Sept. 17, 1963 H. E. ERIKSON ETAL 3,103,864
PHOTOGRAPHIC FILM HOLDER
Filed Aug. 24, 1962 3 Sheets-Sheet 2

INVENTORS
Herman E. Erikson
and
Herbert J. Frede
BY
Brown and Mikulka
ATTORNEYS

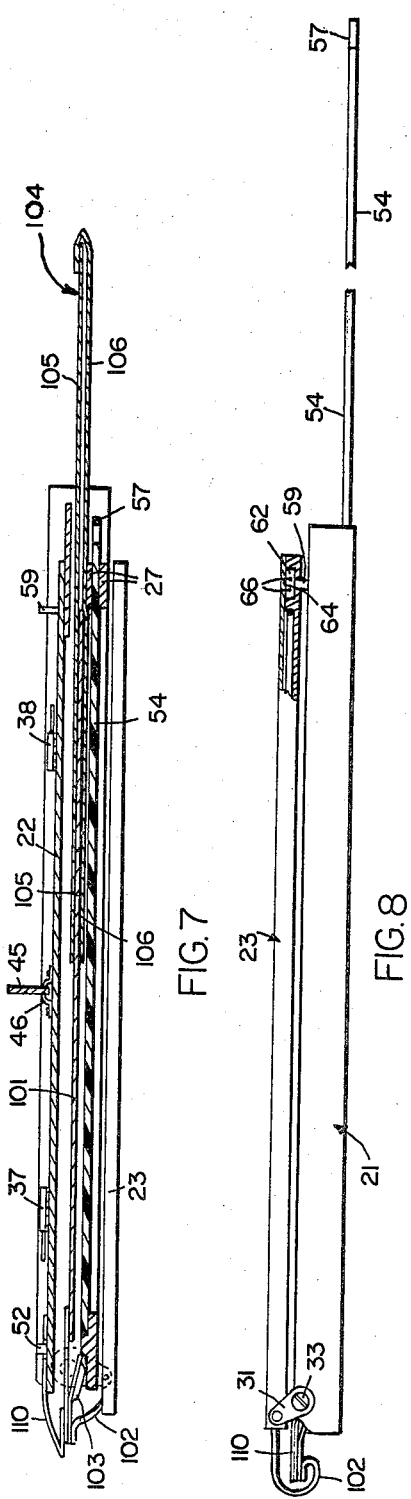

United States Patent Office 3,103,864
Patented Sept. 17, 1963

3,103,864
PHOTOGRAPHIC FILM HOLDER
Herman E. Erikson, Winchester, and Herbert J. Frede, Framingham, Mass., assignors to Polaroid Corporation, Cambridge, Mass., a corporation of Delaware
Filed Aug. 24, 1962, Ser. No. 219,267
16 Claims. (Cl. 95—66)

This invention relates to photography and more specifically to apparatus for holding and positioning photosensitive materials during exposure thereof to actinic radiation.

The prior art includes photographic film assemblies wherein two liquid-confining layers are mountable in superposed relation. One of the layers includes a photosensitive portion adapted to have a latent image formed therein upon exposure to actinic radiation. Means, such as a rupturable container for example, are provided for holding a liquid processing composition which may be distributed between the layers to develop the latent image. An example of such assemblies is that set forth in U.S. Patent No. 2,740,714, issued April 3, 1956, to A. J. Bachelder et al., and assigned to applicants' assignee. This type of film assembly is currently manufactured by Polaroid Corporation of Cambridge, Massachusetts, and designated as Type 3000X Radiographic Packet. The present standard size of the film contained by the assembly is approximately 10" x 12".

Suitable apparatus for holding and positioning such film assemblies during exposure are also included in the prior art. Specific examples of such apparatus may be found in U.S. Patents Nos. 2,689,306, issued September 14, 1954, to Edwin H. Land for Device for Holding Self-Developing Photographic Film and Apparatus for Processing Said Film, and 2,709,223, issued May 24, 1955, to A. J. Bachelder et al. for X-Ray Cassette. Such apparatus is particularly useful in holding such film assemblies during exposure of the photosensitive portion to radiation such as X-rays and gamma rays. The radiation reaches the photosensitive portion to expose the same after passing through the other liquid-confining layer which is transparent to the radiation which effects exposure. Since an exposure of the type desired can be made through the second sheet there is no need to move this sheet out of its superposed relation with the photosensitive portion while the latter is exposed. However, the second sheet is normally not transparent to the longer wave lengths, such as the visible spectrum, so ordinary photographic exposures to visible light cannot be made while the assembly is held in the aforementioned type of device.

It is a principal object of the present invention to provide apparatus for holding film assemblies comprising a plurality of liquid-confining layers which allows exposure of a photosensitive portion of one layer to radiation to which at least one of the other layers is not transparent.

A further object is to provide apparatus for holding a film assembly in operable position for exposure of a photosensitive portion thereof, wherein the assembly includes a second sheet normally superposed upon the photosensitive portion, the apparatus providing means for moving the second sheet away from its superposed position during exposure and for returning it after exposure.

Another object is to provide apparatus for receiving a film assembly comprising a photosensitive sheet and a second sheet in superposed relation with the photosensitive surface facing the second sheet, moving the second sheet out of superposed relation with the photosensitive surface while protecting the same against accidental exposure, holding the photosensitive portion in operable relation to an exposure means, such as a camera, and moving the second sheet back to its initial position after exposure of the photosensitive portion.

A still further object is to provide apparatus for holding during photographic exposure relatively large format film assemblies of the type set forth in U.S. Patent No. 2,740,714, the apparatus providing means for receiving the various elements of the film assembly, for moving the second sheet out of superposed relation with the photosensitive layer, for protecting the photosensitive layer from accidental exposure or fogging, and for permitting the film assembly to be withdrawn with the second sheet and photosensitive layers again in superposed relation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view of one embodiment of apparatus comprising the present invention;

FIG. 2 is a fragmentary, exploded, perspective view of a portion of the apparatus of FIGURE 1;

FIG. 3 is a fragmentary, exploded, perspective view of another portion of the apparatus of FIGURE 1;

FIG. 7 is a side sectional view, as in FIG. 6, with the apparatus and film assembly shown in a subsequent stage of preparation;

FIG. 8 is a side view, with a portion broken away, showing the apparatus positioned for exposure of the film assembly;

FIG. 9 is a side view showing the position of the apparatus as the film unit is withdrawn therefrom for processing;

FIG. 10 is an end view in section on the line 10—10 of FIG. 4;

FIG. 11 is a fragmentary view, with portions broken away, of certain portions of the apparatus of FIG. 1.

Figure 5:
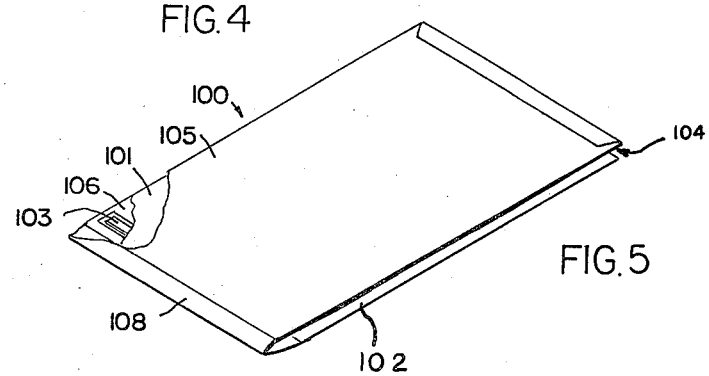
FIG. 5 is a perspective view, with portions broken away, of a film assembly intended to be used in the present invention.

Referring now to the drawings, wherein like parts are designated by common reference numerals throughout the several views, there is shown in FIGURE 1 an embodiment of an apparatus 20 for carrying out photographic exposure of a self-developing film unit of the character shown in FIG. 5 and designated by the numeral 100. As disclosed in these figures of the drawings, film holder 20 comprises front frame portion 21, latchable back plate 22 and hollow, sheet-receiving enclosure 23, which are relatively associated and movable to accomplish their respective functions in a manner which will presently appear.

The terms "front frame", "front portion", "front" and the like are applied to those portions of the apparatus through which actinic radiation is allowed to enter the holder to make an exposure. Likewise, the terms "back plate", "back" and the like are applied to portions of the apparatus directly behind the front plate when in the loaded position, as will be explained hereinafter in greater detail. These terms are used for convenience and simplicity only and not intended in a limiting sense.

Front frame 21 includes side members 24 and 25 and end members 26 and 27 which may be individual structural members secured together by rivets or other fastening means whereby to provide a rigid frame with an opening therein. Alternatively, frame 21 may comprise a casting suitably designed to hold, in cooperation with back plate 22 and enclosure 23, film unit 100. Enclosure 23 is made up of two substantially flat, rigid plates 28 and 29 (FIG. 2), attached or sealed together along three edges, thus providing an opening 30 along one edge of the composite structure. A double pivotal mounting or hinge is provided at each side of enclosure 23 adjacent opening 30 for movably securing front frame 21 and enclosure 23 together. As best seen in FIG. 2, link 31 is pivotally secured at one end thereof to enclosure 23 by pin 32 which extends rigidly from one side of enclosure 23. At the other end of link 31, screw 33 extends loosely through an opening therein to engage the side of front frame 21. A second, similar connecting arrangement (not shown) is provided on the opposite side of the common edges of enclosure 23 and front frame 21. By virtue of this connecting arrangement, enclosure 23 may lie with plate 28 in contact with front frame 21 or be rotated through substantially 360° to lie with plate 29 in contact with back plate 22. It will also be noted that plate 29 extends somewhat farther than plate 28 at the edge of enclosure 23 wherein opening 30 is provided, for reasons which will be later explained.

Back plate 22 is pivotally attached to front frame 21 adjacent the edge thereof remote from that edge at which enclosure 23 is attached. As shown in FIG. 3, projecting tab 34 projects through an opening 35 in cover member 36 into a recess in side member 24. A similar pivotal mounting on side member 25 completes the connection. Other types of hinges may of course be employed whereby front frame 21 and back plate 22 may be pivoted relative to each other through any desired angle, although 180° is sufficient to allow the apparatus to be manipulated with ease.

Figure 4:
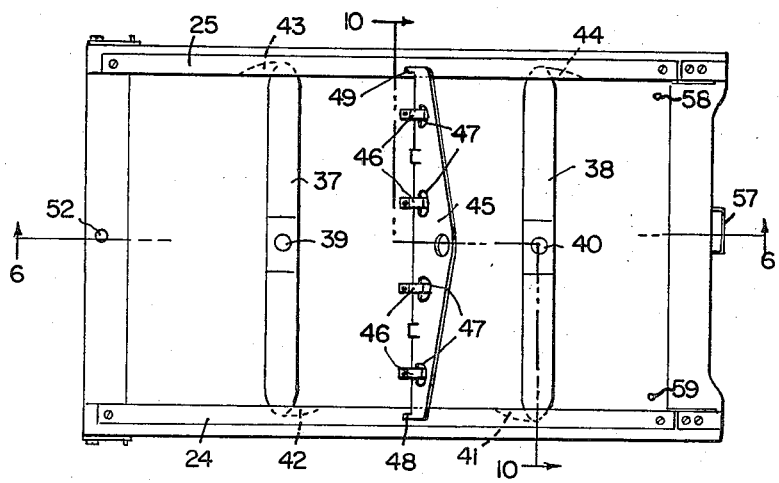
FIG. 4 is a plan view of the apparatus of FIGURE 1 taken from the back thereof.

Latch means are provided for releasably securing back plate 22 and front frame 21 together when the two are in superposed position, as in FIG. 4. In the embodiment shown, two similar latch mechanisms in the form of leaf springs 37 and 38, pivotally mounted on pins 39 and 40 respectively, are provided on back plate 22. When in their normal, undistorted position, springs 37 and 38 extend upwardly from the center, whereby the ends of the springs are above side members 24 and 25 of front frame 21 when back plate 22 is superposed thereon. Side member 24 is provided with recesses 41 and 42 cut into the side thereof, as indicated by dotted lines in FIG. 4. Similarly, side member 25 is provided with recesses 43 and 44. In order to latch back plate 22 to front frame 21, springs 37 and 38 are rotated so that their ends may be depressed without contacting side members 24 and 25. After the ends of the springs are manually depressed the springs are again rotated, while held in the depressed position, until the ends are engaged in the recesses as shown in FIG. 4. The upward pressure of the ends of springs 37 and 38 on side members 24 and 25 results in a downward pressure of back plate 22 against front frame 21. It will be appreciated that other types of latch mechanisms may be utilized, such for example as latch means operable from the outer side edges of front frame 21.

For reasons to be explained more fully in connection with the operation of the device, back plate 22 is provided with cam bar 45, movably secured thereto by a plurality of brackets 46 which extend through openings 47. Cam bar 45 comprises a flat, elongated strip of rigid material which may lie flat against back plate 22, as shown in FIG. 4, or be rotated about its longitudinal axis to a position perpendicular to back plate 22, as in FIGS. 7, 9 and 10. When back plate 22 is latched to front frame 21 the outermost end portions of cam bar 45 extend over side members 24 and 25. Tabs 48 and 49 on these end portions act as levers when cam bar 45 is rotated to a perpendicular position with respect to back plate 22 when the latter is in the latched position. That is, as cam bar 45 is rotated about its longitudinal axis to the position of FIG. 7, tabs 48 and 49 bear against side members 24 and 25. This causes cam bar 45 to lift upwardly on brackets 46 which are fixedly attached to back plate 22. Thus, back plate 22 is forced away from front frame 21 against the bias of springs 37 and 38 by movement of cam bar 45.

Use and operation of film holder 20 may best be understood in conjunction with a film assembly usable therewith. As has been previously pointed out, film holder 20 is specially designed for use with a film assembly of the self-developing type. A film assembly of this general character suitable for use in the film holder of the present invention is shown in FIG. 5 and designated generally by the numeral 100. Film assembly 100 comprises a pair of liquid-confining layers 101 and 102 which are hinged together at one end whereby they may be arranged in overlying relation or may be spread apart with respect to each other. Liquid-confining layer 101 includes a photosensitive area over at least a portion of the surface thereof adapted to be arranged in overlying relation to layer 102. A preferred photosensitive material is a silver halide emulsion and layer 101 comprises conventional film base material on which the photosensitive emulsion is carried. The liquid-confining layer 102 preferably includes a print-carrying area for receiving an image on at least a portion of the surface thereof adapted to be in overlying relation to the photosensitive portion of layer 101. A conventional photographic insensitive paper such as baryta paper is suitable support for such a print-carrying layer or positive element for a transfer image.

A rupturable container 103 holding a liquid photographic processing composition is mounted between liquid-confining layers 101 and 102 and is located at the hinged end of said layers to extend transversely thereof for the discharge of its liquid content, upon rupture, between said liquid-confining layers.

It is desirable to provide means which permit film assembly 100 to be handled in the presence of light which is actinic to the photosensitive material of the film assembly, i.e., visible and near visible light. For this purpose opaque envelope 104 is provided. Envelope 104 is adapted to be removably mounted around liquid-confining layer 101 which carries the photosensitive material and may be formed of conventional flexible material, such as paper or the like, which is rendered opaque to visible and near visible light by an appropriate dye or pigment. A single sheet of material folded over upon itself to form overlying wall members 105 and 106 is employed to provide envelope 104. Wall members 105 and 106 are of unequal length and are sealed or otherwise secured together along their superposed longitudinal edges on three sides.

That portion of film assembly 100 which includes the photosensitive portion is inserted within envelope 104 through the open end thereof whereby envelope wall 106 lies between the photosensitive portion of layer 101 and the image-receiving portion of layer 102. Envelope wall 106 is longer than layer 101 so that wall 106 may extend from the closed end of envelope 104 to a position adjacent container 103 whereby the container may be seated on the outer surface of the envelope wall 106 and assists in providing a lighttight closure at the hinged or leading end of film assembly 100.

Figure 6:
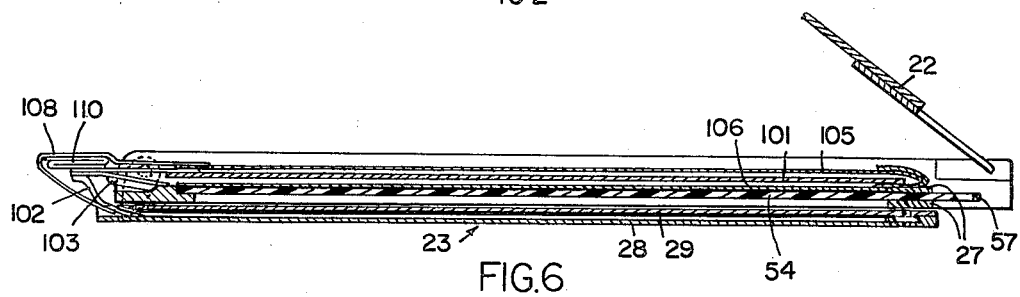
FIG. 6 is a side view in section on the line 6—6 of FIG. 4, with the film assembly of FIG. 5 inserted in the apparatus.

As may be observed from FIG. 6, end portion 108 of envelope 104 is wrapped around the hinged ends of layers 101 and 102 and secured to the outer surface of envelope wall 105 and layer 102. The constructional features of the film assembly thus cooperate to provide a lighttight closure for envelope 104 at the leading end of film assembly 100. Any convenient means, such as a tear string, perforations, or the like, may be provided so that end portion 108 may be severed from the remainder of envelope 104, thus allowing the envelope to be removed from layer 101 when desired.

To facilitate handling of film assembly 100, especially in the removal of envelope 104 preparatory to making an exposure, there is provided tab member 110 which is located at the leading edge of the assembly. Tab 110 is of a convenient width and length for manual engagement and is centered on the longitudinal axis of the film assembly. In the embodiment shown, tab 110 is folded inside end portion 107 of envelope 104 and is accessible only after the end portion has been removed.

The self-developing film assembly of FIG. 5 is employed to carry out a photographic transfer process which, as it is now well understood in the art, is usable to provide in a print-carrying layer, such as liquid-confining layer 102 a reverse image of a latent image formed by exposure to actinic light of photographic negative material such as liquid-confining layer 101. Transfer processing includes spreading a photographic developer and a silver halide fixer between the liquid-confining layers and bringing the layers into contact with each other. This may be accomplished by applying pressure to the opposite sides of film assembly 100 by drawing the assembly through a pair of pressure-applying or wringer rolls. The result of this processing is to develop the latent image to silver and to form in the photosensitive material carried by layer 101 a soluble silver complex from unexposed silver halide for transfer to layer 102 which acts as a print-carrying element. This complex, at least in part, is transferred by imbibition to the print-carrying layer where it is developed to silver to provide the desired reversed image. After processing is completed layers 101 and 102 are stripped apart. In certain instances, it is desirable to provide a recoverable developed and fixed negative image either in conjunction with or instead of the transfer or positive image. Film unit 100 is adapted for such applications by appropriate formulation of the processing liquid employed in container 103.

The principles of the transfer process referred to above, as well as specific film structures and materials for film assemblies suitable for use in conjunction with the present invention, are set forth in United States Patents Nos. 2,543,181, issued February 27, 1951, 2,544,268, issued March 6, 1951, 2,634,886 issued April 14, 1953, 2,603,565, issued July 15, 1952, 2,647,056, issued July 28, 1953, and 2,565,376, 2,565,377, and 2,565,378, issued August 21, 1951. All of the patents enumerated in the preceding sentence are issued to Edwin H. Land and assigned to applicants' assignee.

Figure 6A:
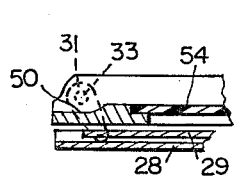
FIG. 6a is a fragmentary view of a portion of FIG. 6 showing certain elements in an alternate position.

Preparation of film holder 20 and film assembly 100 for use is carried out preferably by placing the film holder upon a supporting surface such as a table top with enclosure 23 in contact with the support, front frame 21 lying on enclosure 23, and back plate 22 moved to a position out of contact with front frame 21. This position of film holder 20 is illustrated in FIG. 6 and is the position in which a film assembly can best be inserted in the holder in the proper manner. It will be noted that enclosure 23 may be in either of two positions when in contact with front frame 21 due to the double pivot arrangement of link 31. These two positions are shown in FIGS. 6 and 6a, that shown in FIG. 6 being the preferred position for insertion of a film assembly in the holder. As previously described, film assembly 100 initially comprises two major portions, sheet or liquid-confining layer 102 and envelope 104 which encloses photosensitive layer 101, which are hingedly attached along a common edge. The two portions are separated and inserted into holder 20 from the edges farthest from the hinge connection. Layer 102 is inserted into enclosure 23 through opening 30 while envelope 104 is placed on the opposite surface of front frame 21, as shown in FIG. 6.

Insertion of layer 102 into enclosure 23 is facilitated by the fact that plate 29 is longer than plate 28, as previously mentioned. Thus, the end of layer 102 may simply be laid upon the portion of plate 29 which extends past plate 28 and the layer will automatically enter enclosure 23 through opening 30 as film assembly 100 is advanced from left to right as seen in FIG. 6.

End member 26 of front frame 21 is provided along one edge with a relieved or cutaway portion 50. When film unit 100 is inserted in film holder 20, as seen in FIGS. 6 through 9, rupturable container 103 rests in recess 50 and is thus protected from damage when back plate 22 is in the latched position.

When film assembly 100 has been placed in the position of FIG. 6, back plate 22 is moved about its hinged connection into contact with front frame 21 and latched thereto as previously explained. A suitable material, such as black felt, is preferably provided for maintaining a lighttight seal between the side and end members of front frame 21 and back plate 22 when the latter is in the latched position. With back plate 22 latched, end portion 108 of envelope 104 may be torn away, exposing tab 110. The various elements of the film holder and assembly are now in the position illustrated in FIG. 7.

The next step is the removal of envelope 104 from its enclosure of layer 101 which includes the photosensitive portion of the film assembly. With back plate 22 in the latched position, however, envelope 104 is clamped rather tightly between front frame 21 and back plate 22. The purpose of cam bar 45 will now be apparent since, by movement of the bar to an upright position, that is, perpendicular to back plate 22, the pressure between back plate 22 and front frame 21 is relieved. End portions 48 and 49 bear downwardly on side members 24 and 25, causing cam bar 45 to lift on brackets 46. The frictional engagement of envelope 104 between front frame 21 and back plate 22 is thus relieved, allowing the envelope to be removed from between the two. As may be seen from FIG. 7, the end of envelope 104 farthest from the hinged connection of film assembly 100 extends for a short distance past back plate 22. This end of envelope 104 may be manually grasped and the envelope withdrawn from the film holder. To prevent movement of the remainder of film assembly 100 as envelope 104 is withdrawn, tab 110 is drawn around the adjacent edge of back plate 22 and held securely in contact therewith while envelope 104 is withdrawn from the opposite end of film holder 20. If desired, tab 110 may be provided with a hole adapted to engage an upstanding stud 52 (FIG. 7) on back plate 22. Such a provision obviates the necessity of manually holding tab 110 while envelope 104 is withdrawn. After withdrawal of envelope 104, cam bar 45 is returned to its original position, thus clamping layer 101 firmly between front frame 21 and back plate 22.

As a means for protecting the photosensitive portion of the film assembly from being light-struck after envelope 104 has been removed, front frame 21 is provided with a movable dark slide 54 which is adapted to cover the opening defined by the side and end members of front frame 21. Dark slide 54 is slidably inserted in a conventional manner through a slit which extends through and transversely across end member 27 engaged on its sides in grooves or channels 55 and 56 (FIG. 10) in side members 24 and 25 and movable between covering (FIGS. 6 and 7) and uncovering (FIG. 8) positions with respect to the opening defined by the side and end members of front frame 21, and thus with respect to the photosensitive portion of film assembly 100 when the latter is loaded in film holder 20. A groove is also provided in end member 27 which is engaged by the trailing edge of dark slide 54 when in the fully covering position. In order to insure a lighttight seal at the edges of dark slide 54, the openings and grooves in the side and end members of front frame 21 are preferably lined with black felt in a conventional manner. Handle 57 may be provided on the leading edge of dark slide 54 to assist in the movement thereof between the aforementioned positions. A lighttight compartment is thus formed by front frame 21, back plate 22 and dark slide 54 for holding photosensitive layer 101.

After film assembly 100 has been inserted in the holder, back plate 22 latched to front frame 21 and envelope 104 removed (FIG. 7), enclosure 23 is rotated about the double pivotal mounting through substantially 360° to a position on the opposite side of film holder 20. Layer 102 is thus moved out of superposed relation to the photosensitive surface of layer 101 and dark slide 54 is now the only thing preventing exposure thereof. Although rotation of enclosure 23 through only 90° would be sufficient to allow direct, frontal exposure of layer 101, rotation through 360°, into contact with back plate 22 as seen in FIG. 3, is preferred for compactness of the apparatus during exposure.

Figure 12:
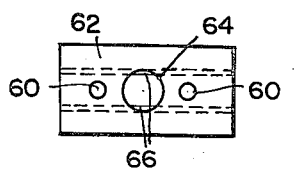
FIG. 12 is a top plan view of an element of the apparatus of FIG. 11.

In order to maintain enclosure 23 in contact with back plate 22 without manually holding the assembly in this position, an appropriate latch or other holding means may be provided. In the illustrated embodiment, a pair of pins 58 and 59 (FIG. 4) are provided on back plate 22 near the hinged connection thereof with front frame 21. Pins 58 and 59 cooperate with holding means on enclosure 23, best seen in FIGS. 11 and 12. Secured between plates 28 and 29 of enclosure 23 by any convenient means, such as rivets 60, are block members 61 and 62, each of which is provided with a centrally disposed opening 63 and 64 respectively, aligned with similar openings in plates 28 and 29. Frictional engagement members such as wires 65 and 66 are provided in openings 63 and 64 respectively. Wires 65 and 66 may be secured by being imbedded in blocks 61 and 62 or by any other convenient method. When enclosure 23 has been placed in contact with back plate 22, as shown in FIG. 8, pins 58 and 59 will be aligned with and inserted through openings 63 and 64, and held in frictional engagement between wires 65 and 66. Enclosure 23 may be manually disengaged from the above-described frictional connection to be rotated back to the position of FIG. 6.

Film holder 20 is now ready to be installed in operative relation to an exposure means, such as a photographic camera, which includes means for mounting film holder 20 thereon with photosensitive layer 101 in the exposure plane. For example, a view-type camera of conventional design having a rear opening for receiving a focusing panel and of proper dimensions such that film holder 20 may be mounted in covering relation thereto comprises a suitable form of exposure means for employment of the present invention.

A further example of exposure means with which the present invention may be usefully employed is a scintillation scanner such as is used for "mapping" the radioisotope content of various organs of the body. Such scintillation scanners include lighttight compartments wherein a photographic film is exposed by a light source which receives amplified signals from a photomultiplier activated by a crystal monitoring the radioactive area. Since the light source must impinge directly on the photosensitive surface of the film, layer 102 of film assembly 100 must be moved out of the way by means such as the apparatus of the present invention in order that such an assembly may be used in this application.

When film holder 20 has been installed on or within the exposure means with which it is to be used, with the photosensitive surface of layer 101 facing the source of exposing radiation, dark slide 54 is moved to the uncovering position of FIG. 8. The photosensitive film may then be exposed in conventional manner with the camera or other exposure means. After making such exposure, whereby a latent image is formed in the photosensitive film, dark slide 54 is returned to the covering position and film holder 20 may be removed from lighttight contact upon or within the exposure means.

Film assembly 100 is now ready for processing of the latent image contained in layer 101 and, depending upon the particular film assembly used, forming a positive transfer print in layer 102. Apparatus commonly used in the processing of film assemblies of the type here under consideration is fully described in U.S. Patent 2,638,828, issued May 19, 1953, to A. J. Bachelder et al. Briefly, the assembly may be processed in such apparatus by placing film holder 20, with assembly 100 contained therein, inside a lighttight compartment of the processing apparatus. Assembly 100 is passed, hinged end first, through a pair of pressure-applying members which rupture container 103 and spread the contents thereof between layers 101 and 102. At the expiration of a predetermined processing period, also carried on within a lighttight compartment, assembly 100 is removed from the processor and layers 101 and 102 are stripped apart and may be washed or a protective coating applied thereto in accordance with well-known practice.

After removal of film holder 20 and prior to initiation of processing, enclosure 23 is again rotated through substantially 360° about its pivotal connection with front frame 21. If the processing apparatus described in the last-mentioned U.S. patent and currently manufactured by Picker X-ray Corporation of White Plains, N.Y., is used in the processing of film assembly 100, enclosure 23 is preferably placed in the position of FIG. 6a due to dimensional requirements of the processing apparatus. A pair of pressure-applying rollers 70, such as those in the processing apparatus, are shown diagrammatically in FIG. 9. Tab 110 is inserted between and engaged by rollers 70 and cam bar 45 is again moved to the upright or perpendicular position to relieve the frictional engagement of layer 101 between front frame 21 and back plate 22. Rotation of rollers 70 may then withdraw film unit 100 from holder 20, as shown in FIG. 9, and effect spreading of the processing liquid carried by container 103 between layers 101 and 102.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for holding and positioning during exposure a photographic film assembly of the shelf-developing type having a plurality of hingedly attached sheets at least one first sheet of which includes a photosensitive portion on one surface thereof and having at least one second sheet normally arranged in superposed relation to said photosensitive portion, said apparatus comprising, in combination, a frame having side and end members defining an opening therebetween, a back plate member hingedly attached to said frame and movable into a contacting position with one side of said frame with said first sheet between said back plate and said frame, means for releasably securing said back plate member in said contacting position, cover means movable between covering and uncovering positions with respect to said opening, and means for moving said second sheet away, from superposed relation with said one sheet.

2. Apparatus for holding and positioning during exposure a photographic film assembly of the self-developing type having a plurality of hingedly attached sheets at least one first sheet of which includes a photosensitive portion on one surface thereof and having at least one second sheet normally arranged in superposed relation to said photosensitive portion, said apparatus comprising, in combination, a frame having side and end members defining an opening through said frame, said frame having a front and a back surface, a back plate member adapted to be moved into covering relation to said opening by contacting said back surface of said frame, covering means adapted to be moved between covering and uncovering positions with respect to said opening in proximity to said front surface of said frame whereby, when said covering means is in said covering position and said back plate is in said covering relation, a compartment adapted to hold therein said first sheet is formed by said frame, back plate member and covering means, said second sheet being outside said compartment, and means for moving said second sheet away from said superposed relation while said first sheet remains stationary within said compartment.

3. Apparatus for holding and positioning during exposure a photographic film assembly of the self-developing type having a plurality of hingedly attached sheets at least one first sheet of which includes a photosensitive portion on one surface thereof and having at least one second sheet normally arranged in superposed relation to said photosensitive portion, said apparatus comprising, in combination, a frame including two side and two end members defining a substantially rectangular opening and having a front and a back surface, at least a portion of said back surface being adapted to receive thereon said first sheet with said photosensitive portion thereof in covering relation to said opening and facing said front surface, said second sheet being positioned on the opposite side of said frame from said first sheet, a back plate member hingedly attached to said frame member and movable with respect thereto between a first position, wherein said back plate member contacts said back surface on all sides of said opening, and a second position, wherein said back plate member is moved a sufficient distance away from said back surface to allow said first sheet to be inserted there between, means for releasably securing said back plate member in said first position, covering means movable between a covering and an uncovering position with respect to said photosensitive portion when said first sheet is in covering relation to said opening and facing said front surface, and means for moving said second sheet not less than 90° about its hinged connection with said first sheet.

4. The invention according to claim 3 wherein said covering means comprises an opaque plate slidably mounted in grooves in said frame member.

5. The invention according to claim 4 wherein said means for releasably securing said back plate comprises at least one spring member engageable to urge said back plate toward said frame member.

6. Apparatus for holding and positioning photographic film assemblies, said apparatus comprising, in combination, a frame having two side and two end members mutually connected to define a substantially rectangular opening therebetween, a substantially rectangular back plate member hingedly connected to said frame to rotate about an axis which substantially passes along parallel edges of each, said back plate member being larger than said opening and movable about its hinged connection into a superposed position relative to said frame on one side thereof whereby said back plate overlies said opening, means for releasably securing said back plate and said frame in said superposed position, cover means movable between covering and uncovering positions with respect to said opening, said back plate, frame and covering means defining a lighttight compartment when said back plate is in said superposed position and said cover means is in said covering position, and a flat, hollow enclosure pivotally attached to said frame for rotation about an axis which substantially passes along parallel edges of each, that edge of said frame about which said back plate rotates being directly opposite to that edge about which said enclosure rotates, said enclosure having an elongated opening along that edge at which it is pivotally attached to said frame and being movable between a first position in a plane parallel to said frame on the opposite side thereof from said back plate and a second position wherein said enclosure is rotated through at least 90° about it pivotal attachment.

7. The invention according to claim 6 wherein said enclosure comprises a pair of substantially flat, rectangular plates superposed upon one another in spaced relation and attached along three sides, thereby forming a compartment with an opening along the fourth side.

8. The invention according to claim 7 wherein said enclosure is pivotally attached to said frame by at least one link which is pivotally connected at one end to said frame and at the other end to said enclosure, thereby providing a double pivotal connection between said enclosure and said frame.

9. The invention according to claim 8 wherein said means for releasably securing said back plate comprises at least one spring member engageable to urge said back plate toward said frame.

10. The invention according to claim 9 and including lever means operable to move said back plate a predetermined distance away from said frame against the bias of said spring when the latter is engaged.

11. Apparatus for holding and positioning photographic film assemblies of the type herein described, said apparatus comprising, in combination, a frame having two side and two end members arranged to define a substantially rectangular opening, a back plate member hingedly attached to said frame and movable to overlie said opening on a first side of said frame, cover means movable between covering and uncovering positions relative to said opening in spaced relation to said back plate whereby a lighttight compartment is formed by said frame, back plate and cover means when said back plate overlies said opening and said cover means is in said covering postion, and a substantially flat, hollow enclosure including a pair of rectangular plates arranged in parallel, spaced relation and attached to one another so as to retain said parallel, spaced relation, said enclosure being pivotally attached to said frame for rotation through substantially 360° about an axis substantially coextensive with one of said end members and with one edge of said enclosure, whereby said enclosure may be positioned on either side of said frame.

12. The invention according to claim 11 wherein said back plate is hingedly attached to said frame adjacent the end member opposite said one of said end members.

13. The invention according to claim 12 wherein said cover means comprises a flat, opaque plate mounted on said frame for slidable movement between said covering and uncovering positions.

14. The invention according to claim 13 including means for releasably securing said enclosure to said back plate when the latter is overlying said opening and said enclosure is positioned on the back side of said frame.

15. Apparatus for holding and positioning photographic film units of the self-developing type having a plurality of hingedly connected sheets at least one first sheet of which includes a photosensitive portion on one surface thereof and at least one second sheet arranged in normally superposed relation to said photosensitive portion, said apparatus comprising, in combination, first compartment means adapted to receive therein said first sheet, means for rendering said first compartment lighttight, second compartment means adapted to receive therein said second sheet, means for moving said first and second compartment means relative to one another whereby said second sheet is moved out of said superposed relation, and means for selectively rendering said first compartment non-lighttight to allow photographic exposure of said photosensitive portion.

16. Apparatus for holding and positioning photographic film units of the self-developing type having a plurality of hingedly connected sheets at least one first sheet of which includes a photosensitive portion on one surface thereof and at least one second sheet arranged in normally superposed relation to said photosensitive portion, said apparatus comprising, in combination, a compartment having front and back walls and adapted to receive therein said first sheet with said photosensitive portion facing said front wall, means for moving said front wall between a covering position, wherein said compartment is rendered lighttight, and an uncovering position, wherein said photosensitive portion may be exposed to actinic radiation, movable means outside said compartment for receiving said second sheet when said first sheet is received by said compartment, and means for moving said movable means relative to said compartment whereby said second sheet is moved out of said superposed relation.

References Cited in the file of this patent

UNITED STATES PATENTS

| | | |
|---|---|---|
| 604,455 | Brownell | May 24, 1898 |
| 2,477,291 | Fairbank | July 26, 1949 |
| 2,930,301 | Land | Mar. 29, 1960 |
| 2,946,271 | Craig | July 26, 1960 |